US011216455B2

(12) United States Patent
Tong et al.

(10) Patent No.: US 11,216,455 B2
(45) Date of Patent: Jan. 4, 2022

(54) SUPPORTING SYNERGISTIC AND RETROFITTABLE GRAPH QUERIES INSIDE A RELATIONAL DATABASE

(71) Applicant: INTERNATIONAL BUSINESS MACHINES CORPORATION, Armonk, NY (US)

(72) Inventors: Sui Jun Tong, Beijing (CN); Yuanyuan Tian, San Jose, CA (US); Wen Sun, Beijing (CN); Mir Hamid Pirahesh, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 146 days.

(21) Appl. No.: 16/550,204

(22) Filed: Aug. 24, 2019

(65) Prior Publication Data

US 2021/0056104 A1 Feb. 25, 2021

(51) Int. Cl.
| G06F 16/22 | (2019.01) |
| G06F 16/2452 | (2019.01) |
| G06F 16/2453 | (2019.01) |
| G06F 16/2455 | (2019.01) |
| G06F 16/28 | (2019.01) |
| G06F 16/901 | (2019.01) |

(52) U.S. Cl.
CPC .... G06F 16/24534 (2019.01); G06F 16/2282 (2019.01); G06F 16/287 (2019.01); G06F 16/9024 (2019.01)

(58) Field of Classification Search
CPC .......... G06F 16/24534; G06F 16/2282; G06F 16/287; G06F 16/9024; G06F 16/2455; G06F 16/2452
See application file for complete search history.

(56) References Cited

U.S. PATENT DOCUMENTS

| 5,421,008 | A | 5/1995 | Banning et al. |
| 9,053,210 | B2 | 6/2015 | Elnikety et al. |
| 9,971,806 | B2 | 5/2018 | Hu et al. |
| 2010/0241644 | A1 | 9/2010 | Jackson et al. |
| 2014/0337373 | A1 | 11/2014 | Morsi et al. |
| 2016/0231915 | A1* | 8/2016 | Nhan .................... G06F 16/904 |
| 2017/0177744 | A1 | 6/2017 | Potiagalov et al. |
| 2017/0212931 | A1 | 7/2017 | Chen et al. |
| 2017/0364534 | A1* | 12/2017 | Zhang ..................... G06N 5/04 |
| 2018/0121482 | A1 | 5/2018 | Heen et al. |

(Continued)

OTHER PUBLICATIONS

Mell, P. et al., "Recommendations of the National Institute of Standards and Technology"; NIST Special Publication 800-145 (2011); 7 pgs.

*Primary Examiner* — Jorge A Casanova
(74) *Attorney, Agent, or Firm* — Intelletek Law Group, PLLC; Gabriel Daniel, Esq.

(57) ABSTRACT

A method and system of processing graph query are provided. A graph query is received by a relational database graph module. The graph query is translated into one or more relational database queries. One or more relational database queries are translated to be performed on data stored within a relational database. One or more results from the relational database are received based on the sent one or more relational database queries. A synergistic graph is generated on a display, based on the received one or more results.

18 Claims, 13 Drawing Sheets

(56) References Cited

U.S. PATENT DOCUMENTS

2018/0121501 A1    5/2018  Vaquero Gonzalez et al.
2018/0365303 A1*  12/2018  Prophete ............. G06F 16/2455
2019/0026333 A1    1/2019  Pirahesh et al.

* cited by examiner

```
WITH SimilarPatients(patientID, subscriptionID) AS (
  SELECT patientID, subscriptionID
  FROM TABLE (graphQuery('graphName', 'similarPatients = g.V()
    .has('\patientID\', :patientID).out('\visitDistance\')
    .repeat(out('\ties\').has('\patientID\', x).times()).times(2)
    .repeat(in('\ties\').has('\patientID\', x).times()).times(2)
    g.V('similarPatients').in('\healthDistance\').dedup()
    .values('\patientID\', '\subscriptionID\')'))
)
SELECT patientID, AVG(steps), AVG(exerciseMinutes)
FROM DeviceData d, SimilarPatients p
WHERE d.subscriptionID = p.subscriptionID
GROUP BY patientID
```

410 GRAPH QUERY

Vertex Table 510

| vID | vLabel | vProperties (JSON) |
|---|---|---|
| 1 | "patient" | {"patientID":"1", "name":"Alice", "address":"...", "subscriptionID":"115"} |
| 2 | "diseaseTerm" | {"termID":"64572326", "conceptCode":"44054806", "conceptName":"Type 2 diabetes"} |
| ... | ... | ... |

Edge Table 520

| eID | srcVID | dstVID | eLabel | eProperties (JSON) |
|---|---|---|---|---|
| 9 | 1 | 5 | "hasDisease" | {"description":"..."} |
| 12 | 5 | 6 | "isa" | null |
| ... | ... | ... | ... | ... |

FIG. 5A

530
501 v.tables = [Vertex]
502 Vertex.id = vID
503 Vertex.label = vLabel
504 Vertex.properties = vProperties
505 e.tables = [Edge]
506 Edge.id = eID
507 Edge.src = srcVID
508 Edge.dst = dstVID
509 Edge.label = eLabel

FIG. 5B

```
601  v_tables = Patient | DiseaseTerm
602  Patient.id = 'patient'::patientID
603  Patient.fixed_label = true
604  Patient.label = 'patient'
605  Patient.properties = patientID | name |
       address | subscriptionID
606  DiseaseTerm.id = termID
607  DiseaseTerm.fixed_label = true
608  DiseaseTerm.label = 'diseaseTerm'
609  DiseaseTerm.properties = termID |
       conceptCode | conceptName
610  e_tables = Disease | DiseaseOntology
611  Disease.src = 'patient'::patientID
612  Disease.dst = termID
613  Disease.fixed_label = true
614  Disease.label = 'hasDisease'
615  Disease.combined_edge_id = true
616  DiseaseOntology.src = sourceID
617  DiseaseOntology.dst = targetID
618  DiseaseOntology.label = type
619  DiseaseOntology.combined_edge_id = true
```

FIG. 6

```
input : tables //The set of input tables with schema and
701             primary key and foreign key information
702   Initialize: vertexTables = ∅, edgeTables = ∅
703   for t ∈ tables do
704       if t.hasPrimaryKey() then
705           vertexTables.add(t)                //t is a vertex table
706       if t.foreignKeys.nonEmpty() then       //t is also an edge table
707           edgeTables.add(t)
708       else if t.foreignKeys.size() ≥ 2 then  //t is an edge table
709           edgeTables.add(t)
710   output : (vertexTables, edgeTables)
```

FIG. 7

```
800↘
        input    : vertexTables, edgeTables
801   Initialize: vertexTableConfs = ∅, edgeTableConfs = ∅
802   for t ∈ vertexTables do
803   │   vtc = newVertexTableConf()
804   │   vtc.idField = combine(t.uniqueID, t.primaryKey)
805   │   vtc.hasFixedLabel = true
806   │   vtc.fixedLabel = t.tableName
807   │   vtc.propertyFields = t.columns - t.primaryKey
808   │   vertexTableConfs.add(vtc)
809   for t ∈ edgeTables do
810   │   if t.hasPrimaryKey() then
811   │   │   for fk ∈ t.foreignKeys do
812   │   │   │   etc = newEdgeTableConf()
813   │   │   │   etc.hasCombinedEdgeID = true
814   │   │   │   etc.src = combine(t.uniqueID, t.primaryKey)
815   │   │   │   etc.dst = combine(fk.refTable.uniqueID, fk)
816   │   │   │   etc.hasFixedLabel = true
817   │   │   │   etc.fixedLabel = concat(t.tableName,
          │   │   │       fk.refTable.tableName)
818   │   │   │   etc.propertyFields = t.columns - t.primaryKey -
          │   │   │       union(t.foreignKeys)
819   │   │   │   edgeTableConfs.add(etc)
820   │   else
821   │   │   for fk1, fk2 ∈ t.foreignKeys and fk1≠fk2 do
822   │   │   │   etc = newEdgeTableConf()
823   │   │   │   etc.hasCombinedEdgeID = true
824   │   │   │   etc.src = combine(fk1.refTable.uniqueID, fk1)
825   │   │   │   etc.dst = combine(fk2.refTable.uniqueID, fk2)
826   │   │   │   etc.hasFixedLabel = true
827   │   │   │   etc.fixedLabel = concat(fk1.refTable.tableName,
          │   │   │       t.tableName, fk2.refTable.tableName)
828   │   │   │   etc.propertyFields = t.columns -
          │   │   │       union(t.foreignKeys)
829   │   │   │   edgeTableConfs.add(etc)
        output : (vertexTableConfs, edgeTableConfs)
```

FIG. 8

SUPPORTING SYNERGISTIC AND RETROFITTABLE GRAPH QUERIES INSIDE A RELATIONAL DATABASE

BACKGROUND

Technical Field

The present disclosure generally relates to database technology, and more particularly, to supporting graph queries on a relational database.

Description of the Related Art

In recent years, rapidly growing social networks and other graph datasets have created a high demand for graph analysis systems. Graph analysis systems can be generally categorized into two types: graph processing systems and graph databases. The former, graph processing systems, such as Giraph, GraphLab, and GraphX, focus on batch processing of large graphs, e.g., Running PageRank or connected component detection algorithms on a graph. This type of analysis is usually iterative and long running. In contrast, the latter (i.e., graph databases) such as Neo4j®, JanusGraph®, and SQLg focus more on the relatively low-latency graph queries, such as finding the neighbors of a vertex with certain properties, and retrieving the shortest path between two vertices.

SUMMARY

According to various embodiments, a computing device, a non-transitory computer readable storage medium, and a method are provided for performing a graph query on a relational database. A graph query is received by a relational database graph module. The graph query is translated into one or more relational database queries. The one or more relational database queries are sent to be performed on data stored within a relational database. One or more results from the relational database are received based on the sent one or more relational database queries. A synergistic graph is generated on a display, based on the received one or more results.

In one embodiment, a query engine coupled to the relational database graph module is configured to perform queries only on one or more relational databases.

In one embodiment, the relational database graph module receives one or more results from the relational database based on the sent one or more relational database queries without importing or exporting relational data to the relational database graph module.

In one embodiment, the relational database graph module is configured to be updated in real time to reflect changes in data stored in the relational database.

In one embodiment, the relational database graph module allows the relational database to be synergistic with different types of analytic workloads of different query applications.

In one embodiment, the relational database queries are based on structured query language (SQL®).

In one embodiment, the synergistic graph includes at least one vertex set mapped to one or more relational tables of the relational database, and one edge set mapped to one or more relational tables of the relational database.

In one embodiment, the synergistic graph comprises different types of vertices and different types of edges that are mapped to a same relational table of the relational database.

In one embodiment, at least one vertex set and at least one edge set of the synergistic graph is mapped to more than one relational table. Each relational table represents one type of vertex or edge.

In one embodiment, the sent one or more relational database queries to be performed on data stored within the relational database is accompanied with instructions to limit the one or more relational database queries to a subset of the relational database.

In one embodiment, a plurality of graph operations are combined into one structured query language (SQL®) query.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 4 is a Structured Query Language (SQL®) statement that demonstrates an example analysis for this new application.

FIG. 5A illustrates single vertex and edge tables capturing the same information as four tables of FIG. 3.

FIG. 5B illustrates an example overlay configuration file for a single vertex/edge table, consistent with an illustrative embodiment.

FIG. 6 illustrates an example overlay configuration file for mapping a property graph similar to that of FIG. 2 to four tables of FIG. 3, consistent with an illustrative embodiment.

FIG. 7 illustrates an algorithm to identify vertex tables and edge tables, consistent with an illustrative embodiment.

FIG. 8 illustrates an algorithm that is operative to generate an overlay configuration, consistent with an illustrative embodiment.

DETAILED DESCRIPTION

Overview

Figure 1:
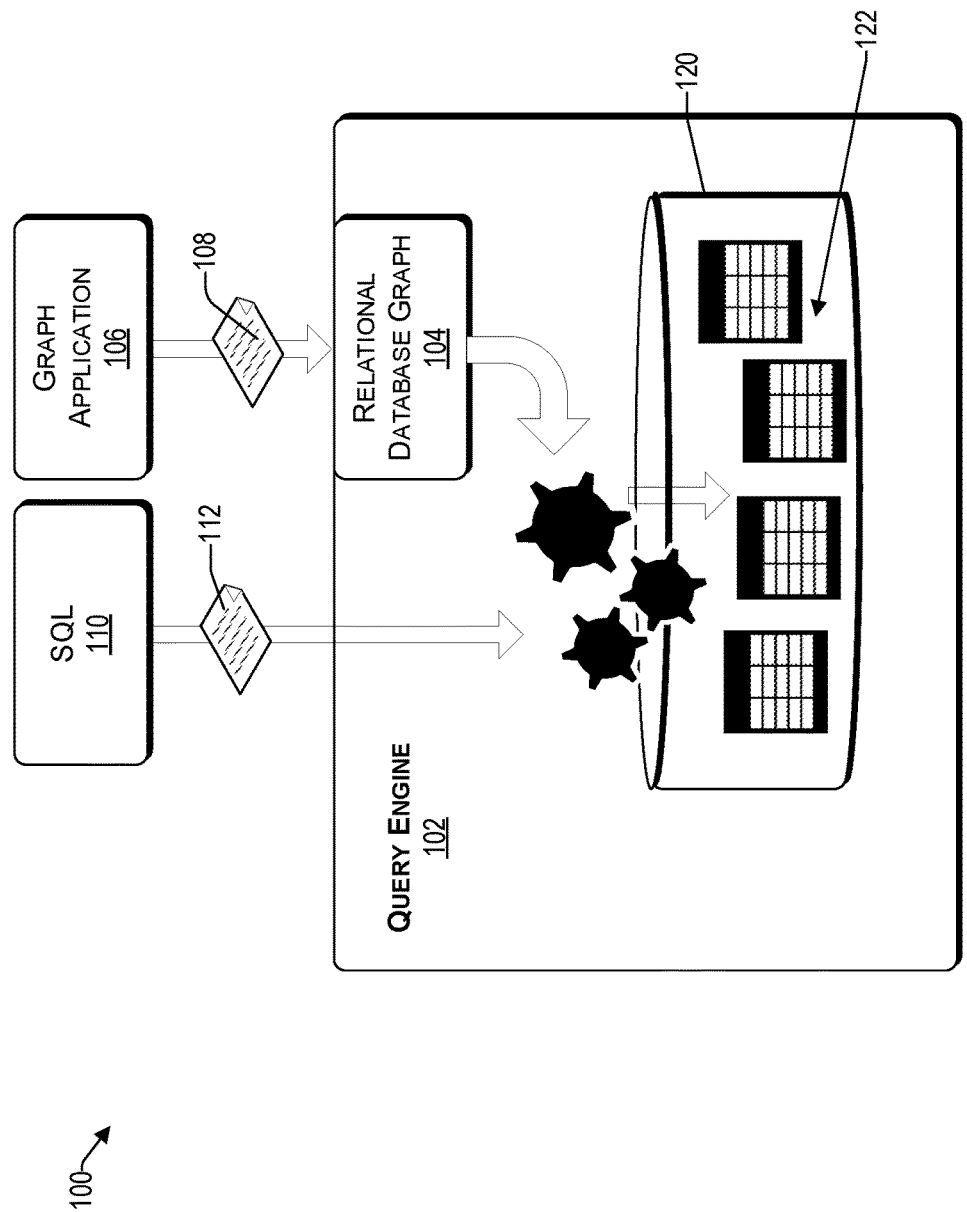
FIG. 1 illustrates an example architecture of a relational database system that is able to process graph queries, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to systems and computerized methods of supporting graphic queries on a relational database. In recent years, to meet the challenge of analyzing rapidly growing graph and network data created by modern applications, a large number of graph databases have emerged, such as Neo4j®, JanusGraph®, SQLg, SQL-Graph, OrientDB, TigerGraph®, Sparksee, ArangoDB®, InfiniteGraph®, BlazeGraph®, and SQL® Server's Graph extension, etc. They can be roughly divided into two camps. The first camp relates to native graph databases, with specialized query and storage engines built from scratch just for graphs. For example, Neo4j®, OrientDB, TigerGraph®, and Sparksee all belong to this camp. The second camp of graph databases, including JanusGraph®, SQLg, SQL-Graph, ArangoDB®, Infinite Graph, BlazeGraph®, and SQL® Sever Graph extension, delegate their storage engines to existing data stores, be it a SQL® database (e.g., SQLg, SQLGraph, InfiniteGraph®, and SQL® Server Graph extension), a key-value store (e.g., JanusGraph®), a document store (e.g., ArangoDB®), or an RDF store (e.g., BlazeGraph®). These are referred to herein as hybrid graph databases. The hybrid graph database discussed herein builds a specialized graph query engine, but resorts to an existing data store to handle the persistence of data. For example, JanusGraph® supports Cassandra®, HBase®, Berkeley DB, and a native in-memory store as the backend storage engine. With Cassandra® or HBase® as the backend storage, JanusGraph® can essentially achieve scalability and high availability of data at no additional cost. Native graph databases, since specially built for graphs from ground up, typically have a slight performance advantage in graph queries. But if the back-end storage engine is a solid and full-fledged data store, the hybrid database can be superior in terms of transaction support, high availability, or disaster recovery.

Graph databases may target low-latency graph queries, such as finding the neighbors of a vertex with certain properties, and retrieving the shortest path between two vertices. Although both camps of graph databases may handle the graph-only queries well, they typically fall short for real life applications involving graph analysis. This shortcoming is due to graph queries not being able to perform an analytics workload of a real-life application. An example real-life application is provided later in the context of the discussion of a property graph model. Graph queries are often only a part of an integrated heterogeneous analytics pipeline, which may include Structured Query Language (SQL®), machine learning, graph and other analytics (e.g., time-series analysis, steam analysis, etc.). Accordingly, known graph queries are presently not sufficiently synergistic with other analytics. Unfortunately, most existing graph databases are standalone and cannot easily integrate with other analytics systems. In addition, many graph data (e.g., data about relationships between objects or people) are already prevalent in existing non-graph databases, although they are not explicitly stored as graphs. None of existing graph databases can retrofit graph queries onto these existing data without replicating data (either in memory or on disk).

Graph queries are often only a part of an integrated heterogeneous analytics pipeline, which may include SQL®, machine learning (ML), graph and other types of analytics. Given the power and prevalence of SQL®, graph queries may be combined with SQL® queries. In addition, graph data itself can be used in SQL®, ML or other types of analytics as well. For example, the properties of graph vertices can be queried in SQL® analytics or be used as the features for training an ML model. Many graph data are already prevalent in the existing non-graph stores. Sometimes this prevalence is due to legacy reasons.

For example, many graph data and graph queries have already existed before the boom of graph databases. In addition, very often, the same data that powered the existing non-graph applications can also be treated as graph data (e.g., Data about relationships between objects or people) and be used for new graph applications. The second reason behind the prevalence of graph data in non-graph stores is that the applications can manage graph queries themselves instead of using specialized graph databases, to achieve the sufficient performance of the overall applications with different analytics workloads.

Unfortunately, existing graph databases are not synergistic with other analytics and are not readily retrofittable to existing data in relational databases. Native graph databases force applications that invoke graph analytics to import data into a proprietary storage engine either at runtime or in a preprocessing step, perform the graph queries, and export the result data to continue with rest of the analytics pipeline. Data import and export can incur substantial computing resource overhead. In contrast, storing graph data in the same storage engine as the data for other analytics, can help eliminate the data transfer overhead. This technical benefit could be particularly beneficial for the hybrid graph databases. Unfortunately, almost all of the hybrid graph databases dictate the schema of storing graphs in the storage engines. Especially, when SQL® databases and key value stores are used as the storage engines, the schema is so complex and unnatural that by just querying the stored data using the query engines of the underlying data stores, it is difficult to extract any meaningful data. For example, SQL-Graph "shreds" the adjacency lists using a hash function into a number of reserved columns in a table, and spills into a second table when hash collision occurs. JanusGraph® stores the entire adjacency list of a vertex in a somewhat encrypted form in one column. Although the graph data is stored in a SQL® database or a key-value store, the opaque schema makes it impractical to decipher what is stored, and thus may make the graph data unusable for any analytics directly using the underlying data stores. This means that the graph application has to replicate the same data using a more comprehensible schema to access the graph data in other analytics. Further, the graph application goes through the trouble to make sure that the two copies are consistent in case of updates. Few hybrid graph databases, like SQLg, may use a more comprehensible schema to store graph data in a SQL® database, thus making the share of graph data among different analytics possible. However, the schema is also dictated, so it is impossible to retrofit to existing graph data that are not stored according to the rigid schema. Microsoft SQL® Server Graph extension enhances SQL® with some graph querying capabilities. However, it involves the creation of vertex and edge tables before they can be used for graph queries. Moreover, certain implicit columns have to be present in the vertex and edge tables. As a result, Microsoft SQL® Server Graph extension may not retrofit to existing relational data. There are also other approaches, such as GRFusion and GraphGen, which may support graph queries on existing relational data. However, both adopt the approach of extracting graphs from the relational tables, and then materializing the graph structures in memory. Graph queries are only served on the in-memory copy of the data. Essentially, this approach also keeps two copies of data, wherein the secondary copy is in memory. As a result, when updates occur to the underlying relational data, the graph queries won't see the latest data.

Accordingly, in one aspect what is described herein is an in-database management software (DBMS) graph query system to support synergistic and retrofittable graph queries inside a relational database, such as IBM Db2®™. The solution is implemented as a layer inside a relational database, referred to herein as a graph layer. This graph layer can support integrated graph and SQL® analytics efficiently. The graph layer uses a graph overlay approach to expose a graph view of the relational data. This approach flexibly retrofits graph queries to existing graph data stored in relational tables, without computer resource extensive data loading or replication, thereby improving computational efficiency. The graph layer optimizes the overall performance of complex analytics workloads and provides performance similar to existing graph databases on graph-only queries, while substantially reducing computational resources. Reference now is made in detail to the examples illustrated in the accompanying drawings and discussed below.

Example Architecture

FIG. 1 illustrates an example architecture 100 of a relational database system that is able to process graph queries, consistent with an illustrative embodiment. The architecture 100 includes a relational database graph layer 104, which is a layer inside query engine 102 specialized for graph queries, as illustrated in FIG. 1. For example, the query engine is a relational database management system that is enhanced by a relational database graph 104 to be able to support graph queries 108 from graph applications 106. The relational database graph 104 is configured to receive a graph query 108 from a graph application 106 as the input and translate the request (i.e., query) into a set of SQL® queries 110. The translated query then executes the graph query 108 by utilizing the query engine 102 through SQL® 110 by using a relational database 120, which may be a conventional relational database. Significantly, graph and SQL® queries 112 operate on the same data stored in the relational database 120 with a more human comprehensible relational schema. relational database graph layer 104 uses a graph overlay approach to extract a graph view of the relational data of the relational database 120. The approach discussed herein flexibly retrofits to existing graph data in relational tables 122. In one embodiment, different vertex and edge types having various sets of properties in the same graph are supported. Example properties are discussed later.

In one embodiment, the relational database graph layer 104 uses TinkerPop Gremlin® as the supported graph query language, while it will be understood that other graph traversal languages can be used as well. For example, existing graph analytics written in Gremlin® can be readily ported to the relational database graph layer 104. Through empirical study on real and synthetic data, applicants have determined that the relational database graph layer 104 achieves performance that is substantially comparable to existing graph databases, while being able to support regular (i.e., not graph databases) such as the relational database 120. Since the relational database graph layer 104 is seamlessly integrated inside the query engine 102 and avoids the unnecessary data transfer overhead incurred in known existing approaches, applicants have identified significant performance improvements in the context of complex analytics workloads of the real world.

In one aspect, the relational database graph layer 104 is configured to be a practical graph database solution for typical applications. Therefore, in addition to query performance (i.e., speed), synergy with other analytics, and retrofit-ability to existing data, other practical issues, such as transaction support, access control, and compliance to audits and regulations, are salient considerations for the relational database graph layer 104.

It is noted that transaction support has been traditionally a sore spot for graph databases. Indeed, existing graph databases either do not support or have very weak support for transactions. In contrast, transaction support has been the strongest suit for relational database management systems (RDBMSs), including the query engine 102. By virtue of embedding the relational database graph layer 104 inside the query engine 102 that supports a relational database, the relational database graph layer 104 enjoys the powerful transaction support of query engines, such as DB2®, to handle graph updates. Since SQL®110 and graph applications 106 share the same data (e.g., relational database 120) underneath, any update to the relational tables 122 from the transactional side is readily available to the graph queries 108.

Access control (e.g., control of who can access the data in a database at what permission level) is another weak point for many existing graph databases. Since no secondary copy of data (either on disk or in memory) is created by the query engine 102, the relational database graph layer 104 directly inherits RDBMS's mature access control mechanisms. Still further, the query engine 102 provides bi-temporal support (e.g., by supporting both system time and business time) without additional computational overhead. For example, such bi-temporal support is particularly useful for compliance, audits, and conforming to regulations, such as general data protection regulation (GDPR). Accordingly, by virtue of the relational database graph layer 104 existing graph databases are enhanced to be able to support by-temporal queries.

In contrast to these existing graph databases, the relational database graph layer 104 is configured to support synergistic and retrofittable graph queries in a relational database 120. The relational database graph layer 104 is not limited to graph queries; rather, it is able to accommodate whole analytics workloads of the real world that involve graph queries (e.g., SQL® queries, graph queries, machine learning etc.). Thus, the relational database graph layer 104 supports new graph queries on legacy relational data, without unnecessary and computationally intensive data loading and replication. In one aspect, the teachings herein related primarily to low-latency graph queries, not batch graph processing.

By way of example only and not by way of limitation, to facilitate the present discussion, the query engine 102 is described herein with the assumption that is inside DB2® for the Gremlin® query language, while it will be understood that other databases and graph query languages are supported as well. Stated differently the relational database graph layer 104 can be agnostic to the actual graph application 106, the query language, and the host query engine 102.

Property Graph Model

Figure 2:
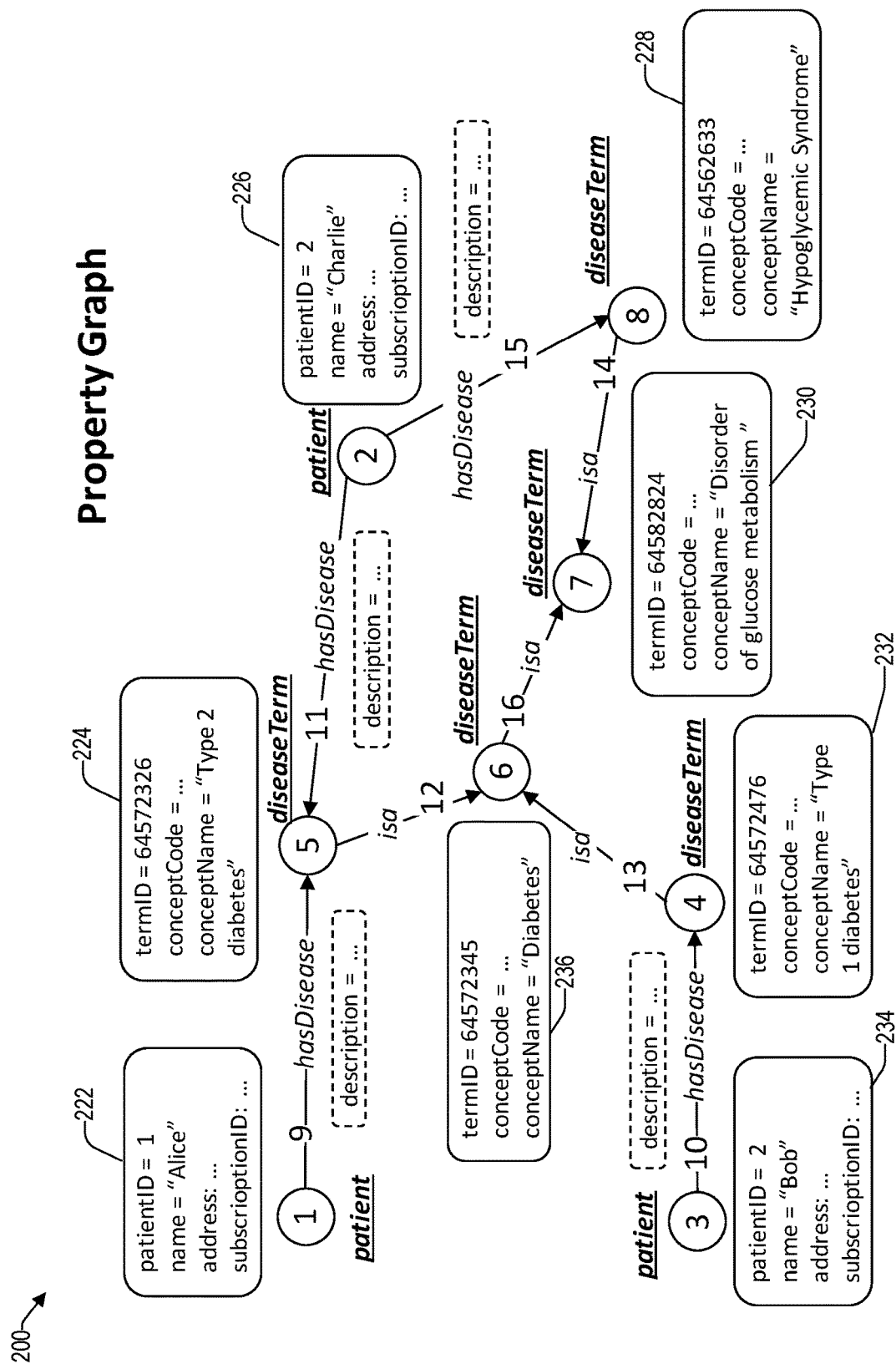
FIG. 2 is an example property graph, consistent with an illustrative embodiment.

Reference now is made to FIG. 2, which is an example property graph 200, consistent with an illustrative embodiment. The property graph includes eight vertices (i.e., 1 to 8) and eight edges (i.e., 9 to 16). The vertices 1 to 8 represent discrete objects, such as patients and disease terms. The edges 9 to 16 capture the relationships between vertices. Both vertices and edges can have an arbitrary number of properties, represented as key-value pairs. Each vertex/edge is uniquely identified with an id in the property graph 200. Vertices/edges can also be tagged with labels to distinguish the different types of objects/relationships in the graph, as illustrated in FIG. 2 by patients and diseases, and between different diseases. The vertex ids are the numbers shown inside the circles (i.e., 1 to 8), and the edge ids are the numbers on the edges (i.e., 9 to 16). There are two types of vertices labeled as patient and disease Terms respectively (represented by bold text next to each vertex in FIG. 2).

An edge connecting a patient to a disease term represents the hasDisease relationship, and an edge connecting a disease term to another denotes the IsA relationship (the former disease is a subtype of the latter) in the disease ontology (edge labels are the red texts on the edges). In an IsA relationship, one class can be specified a subclass of another. Vertex properties are shown inside boxes 222 to 236, whereas edge properties are shown inside the dashed boxes. In one embodiment, vertices and/or edges are allowed to have no properties. For example, vertex 1 has properties patientID, name, address and subscriptionID, whereas edge 9 has one property called description.

By way of example, and not by way of limitation, consider a health care application that combines patients' medical records with exercise data collected from wearable devices. In this regard, reference now is made to FIG. 3, which illustrates various tables 302 to 310 representing relational data that may be found in a relational database. The Patient table 302 includes some basic information about a patient, such as the patientdID, name, address, and subscriptionID, which links the patient to the wearable device data in the DeviceData table 310. A patient's disease information is captured in the Disease table 304. The actual disease is identified by a disease termID (e.g., 64572326 in the example of table 304), which is also a unique key in the DiseaseTerm table 306. For example, a unique key is a column or a set of columns that uniquely identify a row in a table. The relationships between diseases (e.g., Type 2 diabetes is a subtype of diabetes) are captured in the DiseaseOntology table 308. Further, the DeviceData table 310 includes the daily exercise information for a user.

Figure 3:
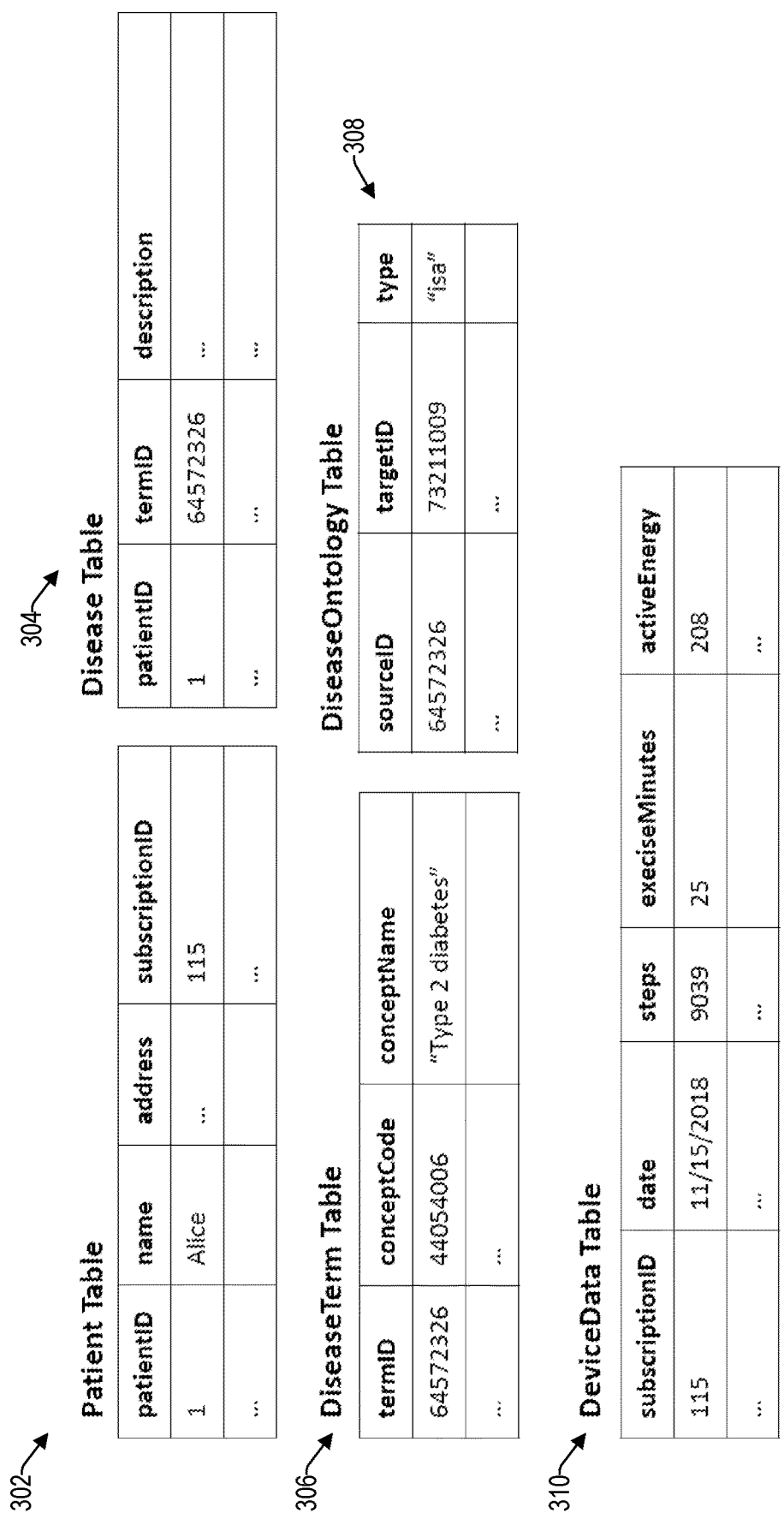
FIG. 3 illustrates various tables representing relational data that may be found in a relational database.

In the example of FIG. 3, assume the patients' medical records as well as the disease ontology data have typically been stored in the relational database to support the existing applications of the customer. However, the customer may also desire to support a new application that combines this data with wearable device data. In addition, the customer may also wish to view the patient-to-disease and the disease-to-disease relationships in the context of a graph, as illustrated in FIG. 2. Consider further that, this new application also involves integrating graph queries together with SQL® analytics. In this regard, reference now is made to FIG. 4, which is an SQL® statement 402 that demonstrates an example analysis for this new application. The algorithm of FIG. 4 finds patients that have similar diseases as a particular patient (with patientID=1), and compares their daily exercise patterns.

The analysis of the algorithm of FIG. 4 combines SQL® with a graph query by utilizing a table function graphQuery, which takes in a graph query language (in this example, Gremlin®) along with a graph query in that language and returns a table back to SQL®. Finding the patients with similar diseases is done inside a graph query 410: it first traverses from the patient vertex to the connecting disease vertices, then traverses the disease ontology 2-hops up and 2-hops down, collecting all the diseases encountered along the way as similar diseases. The algorithm finds all the patients that have any of the diseases and returns their patientIDs and subscriptionIDs 414. Afterwards, SQL® joins the resulting table with the DeviceData table 220, and aggregates the average steps and execiseMinutes per patient.

By virtue of using the relational database graph layer, there is no need to have a separate system to handle graph queries. Further, there is no need to replicate the tables 122 of FIG. 1 in a different format just for graph queries 108. The analysis performed in FIG. 4 can be done in the same query engine 102 with no change to the existing tables 122 of the relational database 120. As a result, the graph data is always up to date with the latest information from the transactional system (i.e., transaction performed by the SQL® engine. For example, when patient information changes, the graph queries 108 see (i.e., receive feedback from the query engine 102) these changes immediately. Further, the temporal support in the query engine 102, such as DB2®, allows all of the graphs to be temporal as well. For example, one can view a graph for different points in time.

Overlaying Graphs on Tables

Graph databases present a single property graph with a vertex set and an edge set for users to query. The single graph need not be fully connected (e.g., it can have different connected subgraphs). Further, there can be different types of vertices and edges. Overlaying a single property graph onto a set of relational tables essentially boils down to mapping the vertex set and the edge set of the graph to the relational tables. In particular, for the vertex set, the mapping specifies: (i) what table(s) store the vertex information, (ii) what table column(s) are mapped to the id field; (iii) what is the label for each vertex (defined from a table column or a constant); and (iv) what columns capture the vertex properties, if any.

Similarly, for the edge, the mapping specifies: (i) what table(s) store the edge information; (ii) what table columns are mapped to the required id, src (source vertex id), and dst (destination vertex id) fields; (iii) what is the label for each edge (defined from a table column or a constant); and (iv) what columns correspond to the edge properties, if any. This graph overlay mapping is achieved by an overlay configuration file in the relational database graph layer 104. Note that the mapping is not restricted to tables only; rather, the mapping can also be on created views of tables. For example, a view is the result set of a stored query on the data, which the database users can query just as they would in a persistent database collection object.

Mapping to a Single Vertex/Edge Table

In one scenario, there is one vertex table and one edge table that the property graph overlays on. If there is a single type of vertices and single type of edges, it is easy to overlay a graph on top of the single vertex and single edge tables. A challenge arises when there are multiple types of vertices and edges, since they often have different vertex and edge properties, which involves different schemas. In one embodiment, the query engine discussed herein supports JavaScript Object Notation (JSON) columns inside a table. JSON accommodates for a schema variety of different vertex and edge types. In this regard, FIG. 5A illustrates single vertex and edge tables 510 and 520 capturing the same information as four tables (i.e., 302, 304, 306, and 308) of FIG. 3. Overlaying a graph like the one in FIG. 2 to the two tables 510 and 520 of FIG. 5A may involve an overlay configuration file 530 as depicted by way of example in FIG. 5B. In the overlay configuration file 530, key words are underlined, table names are in dashed-rectangles, and the remaining parameters represent column names. The configuration file 530, having lines 501 to 509, first defines what table(s) are used for representing the vertex set in line 501. In this example, there is only one table (i.e., called Vertex). Then for each such table, the configuration file 530 specifies what column(s) provide the required id field. In the property graph model, the id field is a requirement for each vertex and it is unique across the entire graph. When there is only one vertex table, the primary key column(s) fit to be the id field.

In the example of FIG. 5A, the vID column is the primary key and can be used to define the id field (line 502) and eID is the primary key of the Edge table. Note that if the primary key is a composite key, such as (col1, col2), then the id field can be defined as col1::col2. The label field in table 510 is also used in the property graph model. It can be mapped either to column(s) of the table, e.g., column vLabel in our case (line 503), or by a constant, as discussed in more detail later.

The properties of a vertex can be mapped to columns of the table. In the example of FIG. 5A, the properties come from the vProperties column of the Vertex table 510. Since vProperties is a JSON column, our relational database graph layer 104 automatically looks into the content of this column and creates the corresponding properties when querying the vertices at runtime. For example, for the first row in the Vertex table 510 of FIG. 5A, the relational database graph layer 104 creates the four properties for the corresponding vertex: patientID, name, address, and subscriptionID. For a normal (e.g., non-JSON) column, however, relational database graph layer 104 uses the column name as the property name and the column value as the property value for the vertex. One can specify multiple columns to define the properties (e.g., JSON columns and normal columns can be mixed together). The relational database graph layer simply combines all the properties together. In one embodiment, vertices are allowed to have no property. In this regard, one can define "<table name>.properties=none". Similarly, the configuration file defines the mapping for the edge set. Note that if the properties parameter is not specified in the configuration, the relational database graph layer may automatically take all the columns in a table, except the ones already used for the required fields for defining the properties. For example, configuration file 530 does not specify properties for the Edge table, but it is equivalent to having "Edge.properties=eProperties" in the file.

Mapping to Multiple Tables

In some embodiments, a property graph is overlaid onto multiple single vertex and/or edge tables. JSON columns may incur extra overhead (e.g., computational resources and time) of runtime interpretation. For example, DB2® may support indexes on JSON data to speed up queries on JSON columns. However, the indexes on relational columns are much faster. In practice, vertices or edges of different types may be stored into separate tables, typically one table for each type, as a result of either legacy and/or efficiency reasons. In this regard, reference now is made to FIG. 6, which illustrates an example overlay configuration file 600 having lines 601 to 619 for mapping a property graph similar to that of FIG. 2, to the four tables 302, 304, 306, and 308 of FIG. 3.

In the overlay configuration file 600, the two tables, Patient and DiseaseTerm (302 and 306, respectively, of FIG. 3), correspond to the vertex set, and the two tables, Disease and DiseaseOntology, correspond to the edge set. In common practice, each type of vertices or edges are typically stored in a separate table, which means that all vertices or edges in a single table share the same label value. Accordingly, it is not necessary, and sometimes not possible, to use a column (in most cases, there is no such column) in the relational table to define the label field. In this regard, in one embodiment, there is a feature to specify that all vertices or edges from a table have the same label. For example, that label is set to a constant string value. Lines 603 and 604 of FIG. 6 show such an example for the Patient table 306. As we will discuss in more detail later in the context of the discussion of a graph structure, the feature of specifying that all vertices or edges from a table have the same label provides an optimization opportunity to narrow down the set of tables to query from during runtime, thereby improving computational speed of a query.

When there are multiple relational tables mapping to the vertex set of a property graph, the unique keys of a table may not always uniquely identify the associated vertices in the whole vertex set (across tables). Accordingly, in one embodiment, the unique keys are combined with a unique table identifier to define the id fields of vertices. For example, the unique table identifier can be the table name or some other unique constant value. In this regard, line 602 sets "Patient.id='patient'::patientID". As will be discussed in more detail later in the context of the discussion of a graph structure, this combined vertex id definition provides additional optimization opportunities for query execution.

Mapping the edge id to column(s) of an edge table encounters similar problems, so we can follow the similar approach as vertices, as discussed above. However, in one embodiment, for the edges, the combination of the three fields, src::label::dst, can already uniquely identify an edge in the entire edge set. As a result, an explicit specification of edge id fields in the overlay configuration file 600 is not necessary. For example, in lines 615 and 619, by setting "<table name>.combined edge id=true", we indicate that the edges from Disease and DiseaseOntology tables will use the implicit src::label::dst as the edge ids. Again, this combined edge id definition will also lead to some optimization opportunities as will be discussed in more detail later in the context of the discussion of a graph structure.

In one embodiment, one relational table can serve as both a vertex table and an edge table in one graph overlay. For example, in tables with foreign keys, as they store both the information about objects and their relationships to other objects. We allow these cases in the overlay configuration files. One relational table can serve as aboth a vertex table and an edge table in one graph overlay. In one embodiment, one table can be served as multiple edge tables. In this case, we can use alias to distinguish the different edge tables, e.g., "e.tables=FactTable as ET1|FactTable as ET2".

Automatic Generation of Overlay Configuration

In one embodiment, the overlay configuration is generated automatically by the relational database graph layer 104. The approach leverages table schemas, along with the primary and foreign key constraints, to infer relationships among the data in relational tables. Unlike known approaches that convert relational data to graphs, where the data conversion creates a new copy of the original data, the graph overlay discussed herein merely creates a virtual graph view on top of the original data (i.e., the tables in a relational database). As a result, the graph schema discussed herein more accurately captures the semantics of the relational data.

In one embodiment, the relational database graph layer 104 of FIG. 1 provides a toolkit, called AutoOverlay, for automatically generating a graph overlay. A user can specify which database he/she wants to generate the overlay configuration for. If only a subset of tables in a database are of interest, the user can also explicitly list these tables. AutoOverlay automatically generates the overlay configuration in the steps provided below.

In a first step, AutoOverlay first queries RDMS catalog, such as a DB2® catalog, to receive metadata information for each table, such as table schema, and primary key/foreign key constraints.

In a second step, the AutoOverlay iterates through all tables to identify the vertex tables and edge tables. In this regard, FIG. 7 illustrates an algorithm 700 to identify vertex tables and edge tables, consistent with an illustrative embodiment. Note that a table can serve as both a vertex table and an edge table. Any table with a primary key will be served as a vertex table. If a table has a primary key and one or more foreign keys (e.g., a fact table in a star schema), the table can also be used as one or more edge tables, one for each foreign key. If a table has k (k≥2) foreign keys but no primary key (e.g., many-to-many relationships), then it can be used as $(_2^k)$ edge tables, one for each pair of foreign keys.

In a third step, AutoOverlay maps the required fields in the property graph model to columns in the vertex/edge tables. In this regard, FIG. 8 illustrates an algorithm 800 having steps 801 to 829 that is operative to generate an overlay configuration, consistent with an illustrative embodiment. For each vertex table, the primary key columns, together with a unique table identifier, are used to define the id field. The label field is defined as a fixed label with the table name as its value. All the remaining columns, except for the primary key columns, are properties.

For each edge table with a primary key and a foreign key, the src field is defined as a combination of the table identifier and the primary key columns, and the dst field is a combination of the identifier of the referenced table (table referenced by the foreign key) and the foreign key columns. The label field is defined as concatenation of the table name and the referenced table name.

For each edge table with a pair of foreign keys, the src field is the first referenced table identifier combined with the first foreign key columns, and the dst field is the second referenced table identifier combined with the second foreign key columns. The label field is the concatenation of the table name and the names of the referenced tables. For both cases, the combined src::label::dst as the edge id is used. All remaining columns, except for primary key and foreign key columns, are properties.

As provided in the content of the steps 801 to 829, the primary and foreign key constraints are used to infer relationships among the data in relational tables. In one embodiment, if no constraint is specified, an overlay can be specified manually for the relational database graph layer. After the overlay configuration is generated automatically by AutoOverlay, the user can still edit the configuration file to modify the mapping information to better fit the application.

Example Implementation

Figure 9:
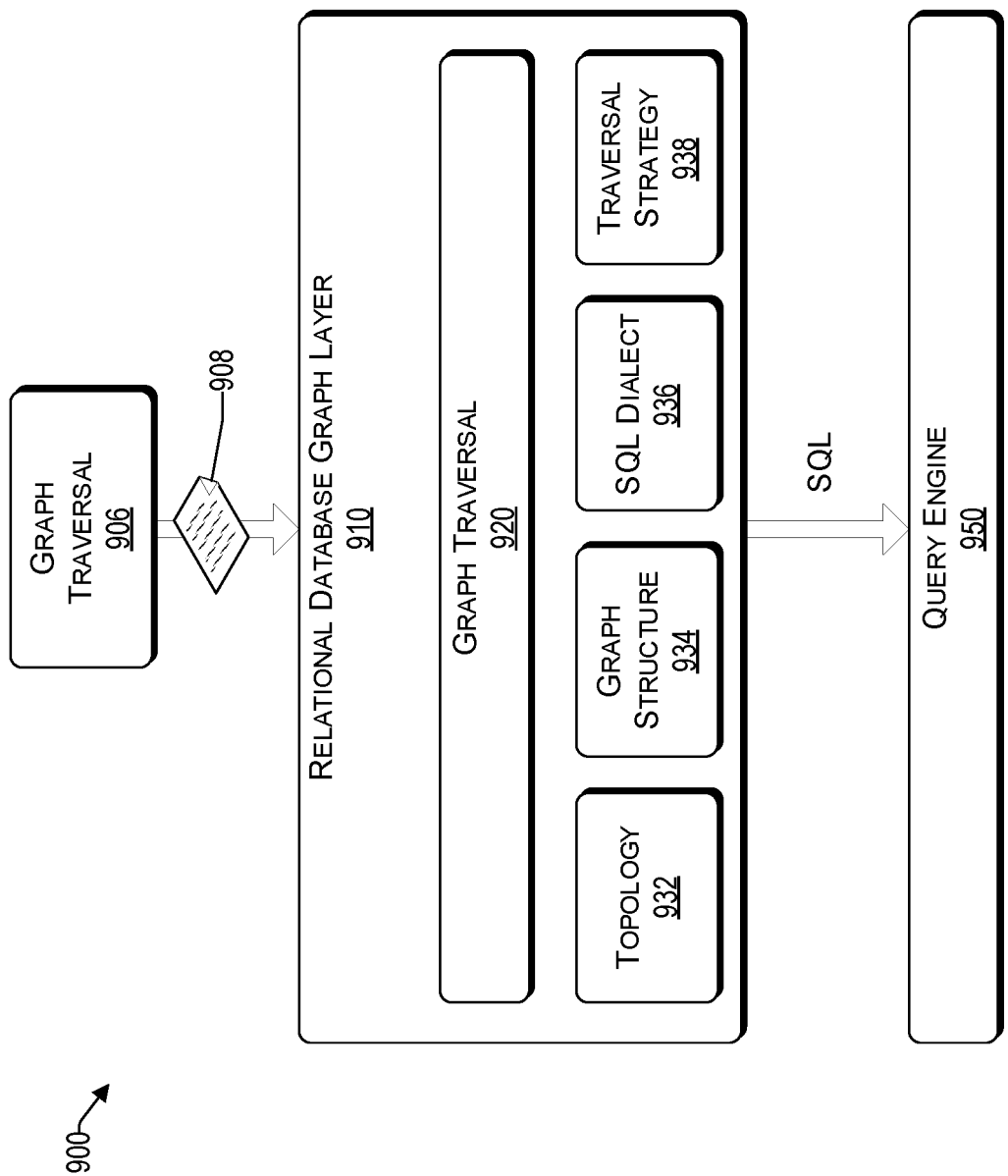
FIG. 9 illustrates an example architecture of a relational database graph layer, consistent with an illustrative embodiment.

Reference now is made to FIG. 9, which is an example architecture 900 of a relational database graph layer, consistent with an illustrative embodiment. It is a layer inside or before a relational database management system, sometimes referred to herein as a query engine. In one example, the relational database graph layer 910 is between a graph traversal language 906 (such as Gremlin®) providing queries 908, and a query engine 950. The relational database graph layer 910 includes a graph traversal module 920 operative to parse the input query 908 and generate query plans. In one embodiment, the graph traversal language is TinkerPop and the query plans are generated by way of Tinkerpop API calls. There are several modules 932 to 938 that are operative to support the graph traversal module 920. The modules include topology 932, graph structure 934, SQL® dialect 936, and traversal strategy 938. Together these modules implement the (e.g., Tinkerpop) core API with the help of the (e.g., DB2®) query engine 950 through SQL® queries.

For example, the TinkerPop core API that DB2® Graph needs to implement includes the graph structure API 934 for the components of a property graph (e.g., Graph, Vertex, Edge, VertexProperty and Property), and the Traversal Strategy API 938, for optimizing graph traversals for a particular query engine 950 backend. Additionally, the Topology module 932 maintains the overlay mapping between a property graph and relational tables. The SQL® Dialect module 936 deals with implementation details specific for the query engine 950.

By way of example, and not by way of limitation, assuming that the graph traversal language 906 is Gremlin®, a graph traversal in can be expressed in a number of steps. Each step captures a transformation (e.g., OutE( )), filter (e.g., hasLabel( )), side-effect (e.g., Store( )), or branch function (e.g., Union( )). For example, the query g.V( ).has('name', 'Alice').outE( ) includes 3 steps. V( ) is a transformation step, called GraphStep (since the transformation is applied on a graph), which returns all the vertices of the graph, then has('name', 'Alice') is a filter step, called HasStep, which filters the vertices, and finally outE( ) is another transformation step, called VertexStep (since the transformation is applied on a vertex), which returns all the outgoing edges of the resulting vertices from the second step. In one embodiment, a graph traversal query executes step by step in Tinkerpop, unless there is a corresponding optimized strategy defined in Traversal Strategy 938. Some of the steps result in calling the graph structure API, of which the relational database graph layer 910 can control the execution, whereas others are executed within the Tinkerpop stack, of which the relational database graph layer 910 may not influence the execution thereof.

In the above example query, the V( ) and outE( ) steps both call the graph structure API, since they access the basic vertex and edge information to execute. However, the has ('name', 'Alice') filter step only needs to filter vertices based on their property values, which are already obtained in the previous step. Thus, there is no need to access the graph structure API 934. We call a step that involves access to the graph structure API 934 as a graph-structure-accessing (GSA) step. In the relational database graph layer 910, each GSA step typically results in a SQL® query to the query engine 950. Each of the modules 932 to 938 is discussed in more detail below.

The topology module 932 takes in the overlay configuration file as discussed above. It then retrieves the meta data of the relational tables referenced in the configuration file from a (e.g., DB2®) catalog. Further, the topology module 932 establishes and maintains the overlay mapping from the property graph onto a set of tables. The three remaining modules 934 to 938 refer to the overlay mapping in the Topology module to properly carry out their functions.

The graph structure module 934 implements a (e.g., TinkerPop) graph structure API, including Graph, Vertex, Edge, VertexProperty, and Property, as well as the basic graph operations on them, such as identifying vertices/edges by ids and identifying the adjacent vertices/edges of a vertex/edge. The graph structure module 934 refers to the overlay mapping in the topology module 932 to decide how to implement graph operations. Further, the graph structure module 934 utilizes the SQL® Dialect module 936 to translate the graph operations into SQL® queries. The implementation in this module may affect the execution of all the graph-structure-accessing steps in TinkerPop. In the relational database graph layer 910, a property graph can overlay on top of multiple vertex and edge tables. By default, when vertices/edges are queried from the graph, all the vertex/edge tables are queried. However, some of the features in the graph overlay configuration provide some opportunities for optimization, including optimization for fixed labels, combined vertex ids, and implicit edge ids, each discussed in more detail below.

A common operation associated with the vertex data structure in a graph traversal language (e.g., TinkerPop) is to determine a vertex's adjacent vertices/edges by edge label(s) (e.g., V.out('hasDisease') and v.inE('hasDisease')). Naively, this may result in querying through all the edge tables with a predicate on the given edge label(s). However, in one embodiment, the graph overlay configuration by the topology module 932 allows an edge table to have a fixed label (i.e., Fixed label=true) for all the edges in it. In such scenario, the relational database graph layer 910 uses the specified edge label(s) to narrow down a subset of edge tables to query from. More specifically, any edge table that has a fixed label but not matched with the query label(s) can be eliminated from the query. In one embodiment, the implementation still performs a search of all the tables without fixed labels to make sure it is not missing any results. This optimization provides a substantial performance (e.g., speed) improvement.

As mentioned above, the combination of vertex ids can be optimized. An operation of the graph structure API 934 module looks up vertices by ids (e.g., G.V(idValue)). Since overlay configuration allows a vertex id to be defined as a combination of a unique table identifier and the primary keys, the relational database graph layer 910 can use the unique table identifier to identify the exact table to search for this vertex, instead of blindly querying through all the vertex tables, thereby saving time and computational resources.

Similarly, for edge ids defined with the implicit src::label::dst combination, when fixed labels are specified for edge tables, the relational database graph layer 910 can utilize the label encoded in the id field to narrow down the tables to search from, for looking up an edge by its id, thereby further saving time and computational resources.

It is noted that in some TinkerPop based graph databases, such as JanusGraph®, add some caching mechanisms for vertices and edges when implementing the graph structure API. In one embodiment, such approach is avoided herein, because the underlying database already has a buffer pool that caches frequently accessed data. Additionally, the graph cache usually works for small graphs and in lower concurrency scenarios. By virtue of using the time proven buffer pool implementation of the query engine, more reliable and stable performance is achieved.

As mentioned above, in one embodiment, the steps in a graph traversal query 908 may be executed step by step in Tinkerpop. SQL® queries can be independently translated from individual steps without considering their neighbor steps. Take the same example g.V( ).has('name', 'Alice').outE( ) The first step (V( )) would be translated into statement similar to SELECT*FROM VertexTable (assuming there is only one vertex table named VertexTable), to get the vertex data from the relational database 910. In a second step, the relational database graph layer 910 would loop through the vertices to find the satisfied ones. For example, satisfying the predicate has ('name', 'Alice'). The outE( ) step is translated into a SQL® query like SELECT*FROM EdgeTable where src in (id1, id2, . . . ) (assuming there is only one edge table named EdgeTable), where id1, id2, etc., are the unique ids of the vertices from the second step. Such approach is inefficient: the first step returns all the vertices in the graph even though the second step would filter out most of the vertices.

Accordingly, in one embodiment, in an effort to reduce the number of SQL® calls to the query engine 950 and to minimize the amount of data transferred between the relational database graph layer 910 to the query engine 950, a TinkerPop interface can be used to add Provider Strategies for more optimized execution for some patterns of steps. Thus, in the relational database graph layer 910, a number of optimized strategies can be added in the Traversal Strategy module 938 to mutate a default strategy for more optimized SQL® queries. These optimized strategies can be commenced with a GSA step, since it results in a SQL® call.

In one embodiment, the GraphStep::VertexStep Mutation optimization strategy is used when a GraphStep that retrieves vertices is followed by a VertexStep. Consider the example g.V(ids).outE( ) which retrieves all the outgoing edges of vertices with id in the set of ids. With default Gremlin® strategy, this query would result into two SQL® queries to the database: SELECT*FROM VertexTable WHERE id in (ids) followed by SELECT*FROM EdgeTable WHERE src in (ids). It is noted that the first SQL® query is not an efficient use of computation resources and therefore should be avoided. Applicants have identified that the second SQL® query alone can provide the results for the graph query, as the vertex ids are already stored in the edge tables as source vertices.

Depending on whether the VertexStep retrieves edges or vertices, the two consecutive steps can be mutated into different new step(s), namely VertexStep retrieving edges and VertexStep retrieving vertices, which are discussed in more detail below.

The VertexStep retrieving edges is substantially similar to the case discussed in the context of g.V(ids).outE( ) above. The relational database graph layer mutates the GraphStep::VertexStep steps into a new GraphStep that retrieves edges, and passes the ids as a predicate on the edges into the GraphStep. In one embodiment, g.V(ids).outE( ) is changed into g.E( ). Note that the predicate using ids is not reflected in the Gremlin® syntax here, but is implemented in the execution of the strategy.

As to VertexStep retrieving vertices, an example thereof is provided by g.V(ids).out( ) In addition to searching the edge table(s), the relational database graph layer uses an extra search on the vertex table(s) for obtaining the resulting vertex information. As a result, the relational database graph layer mutates the GraphStep::VertexStep steps into a new GraphStep that retrieves edges followed by an EdgeVertexStep that retrieves the vertices, and passes the ids as a predicate on the edges into the GraphStep in the implementation of the strategy. In one embodiment, g.V(ids).out( ) is changed to g.E( )inV( ) (e.g., the predicate using ids is implemented in the execution of the strategy). With the present mutation, an unnecessary scan on the vertex table (corresponding to g.V( )) is eliminated in the SQL® translation.

In one embodiment, when a GSA step is followed by a sequence of filter steps, the relational database graph layer can fold these filter steps as extra predicates into the previous GSA step. For example, the query g.V( ).has('name', 'Alice') can be translated into one SQL® query SELECT*FROM VertexTable WHERE name='Alice' (again, assuming one vertex table named VertexTable). For example, the relational database graph layer pushes down the filter steps into the "where" clause of SQL® statement for the GSA step (the filter steps are all removed in the optimized strategy), which results in a significant reduction of the SQL® results returned from the database.

Graph traversals 906 can fetch some particular vertex or edge properties, such as g.V( ).values('name', 'address'), which fetches the values of the name and address properties. When a GSA step is followed by such a PropertiesStep, the relational database graph layer 910 can use the provided set of property names to help reduce the projected columns for the GSA step. In this example, the GraphStep can be translated into SELECT id, label, name, address FROM VertexTable instead of SELECT*FROM VertexTable. Note that the columns of a vertex are still returned, and the PropertiesStep still remains in the optimized strategy.

In one embodiment, for queries like g.V( ).group( ).by ('age'), the relational database graph layer 910 can also fold the group-by step into the previous GSA step. The result is a SQL® with group-by pushed down, SELECT*FROM VertexTable GROUP BY age.

Similarly, the aggregation steps can also be folded into a previous GSA step. For example, the three steps of g.V( ).values('age').min( ) can be translated into one SQL® statement SELECT min(age) FROM VertexTable.

In one embodiment, two or more of the above strategies can be combined together during the translation (i.e., request into a set of SQL® queries). For example, the Gremlin® query g.V(ids).outE( ).has('metIn', 'US').values('years') can be translated into an optimized SQL® statement by applying multiple strategies: SELECT id, src, dst, label, years FROM EdgeTable WHERE metIn='US' AND src in (ids).

In one embodiment, in the implementation of the graph traversal strategies discussed herein, the relational database graph layer 910 can apply another optimization across one or more of these strategies when multiple vertex/edge tables are present, based on our knowledge of the overlay configuration and table schemas. For example, whenever a Gremlin® query mentions a property name, e.g., G.V( ).has ('name', 'Alice') or g.V( ).values('name'), the specified property (e.g., Name), should exist. Since the relational database graph layer 910 has all the property information for each vertex/edge table defined in the overlay configuration, the relational database graph layer can identify whether the specified property exists or not in a vertex/edge table. Then, the tables with the required property are queried in the SQL® statement. In addition, a specific label value can also be used to narrow down a subset of tables to query from (e.g., for queries similar to g.V( ).hasLabel('patient')).

The SQL® dialect module 936 is configured to deal with issues related to query engine, such as the dialect of SQL® the database is using. When translating graph operations into SQL®, the SQL® dialect module 936 utilizes the optimized traversal strategies from the Traversal Strategy module 938 to generate more efficient SQL® queries. The SQL® dialect module 936 creates a set of pre-compiled SQL® templates and issues the corresponding prepare statements in the query engine to avoid the SQL® compilation overhead at runtime. Based on these SQL® templates, the SQL® dialect module 936 can also suggest a set of indexes that will speed up the execution of the translated SQL® queries.

Example Processes

Figure 10:
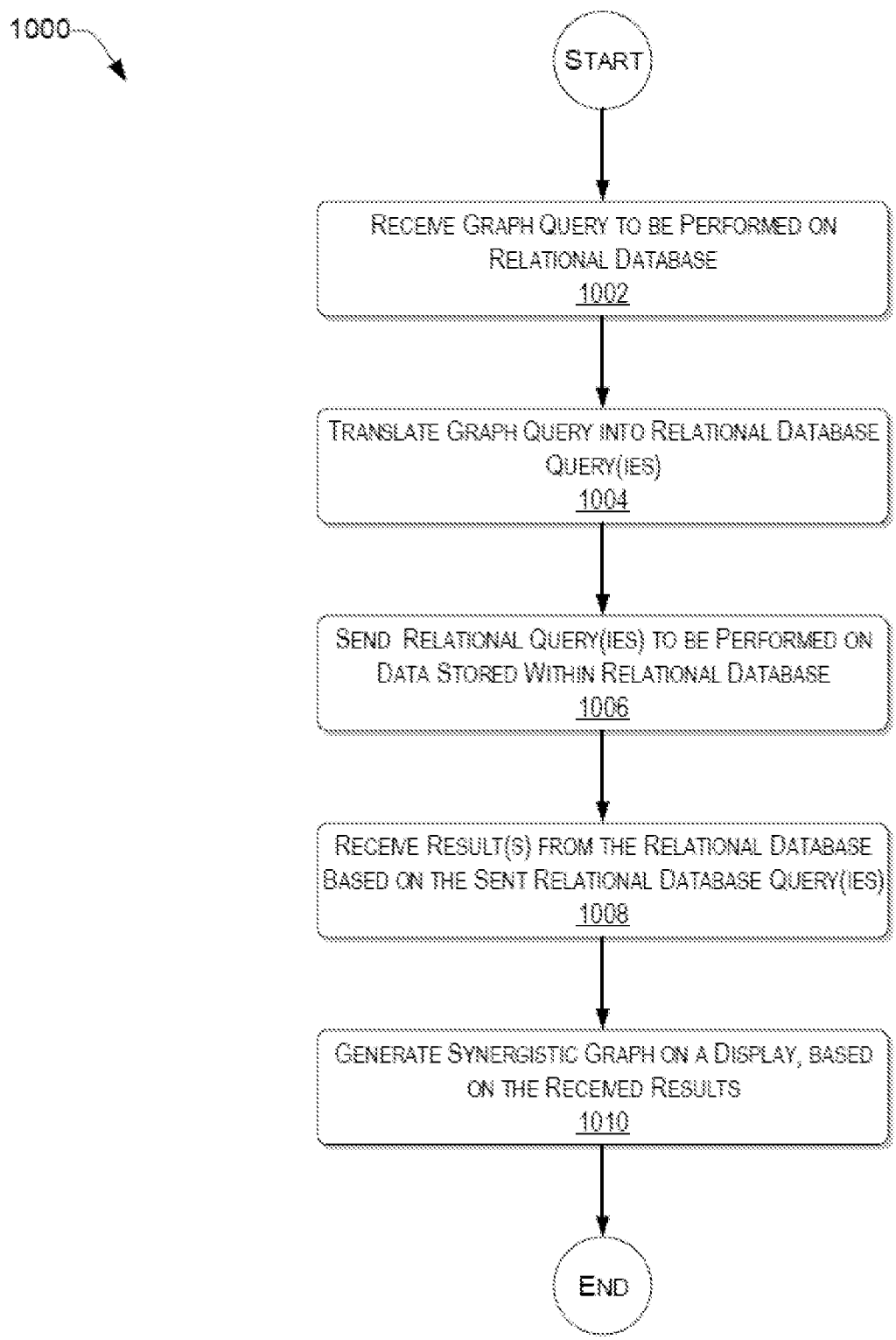
FIG. 10 presents an illustrative process related to performing a synergistic graph query on a relational database, consistent with an illustrative embodiment.

With the foregoing overview of the example architectures 100 and 900, it may be helpful now to consider a high-level discussion of an example process. To that end, FIG. 10 presents an illustrative process related to performing a synergistic graph query on a relational database. Process 1000 is illustrated as a collection of blocks, each in a logical flowchart, which represent sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 1000 is described with reference to the architecture 100 of FIG. 1.

At block 1002, the relational database graph layer 104 receives a graph query 108 to be performed on a relational database 120.

At block 1004, the relational database graph layer 104 translates the graph query 108 into one or more relational database queries.

At block 1006, the relational database graph layer 104 sends the one or more relational database queries to the relational database 120 such that a query is performed on data stored therein.

At block 1008, the relational database graph layer 104 receives one or more results from the relational database 120 based on the sent one or more relational database queries.

At block 1010, the relational database graph layer 104 generates a synergistic graph based on the received one or more results. This graph can be displayed on a user interface of a computing device.

Example Computer Platform

Figure 11:
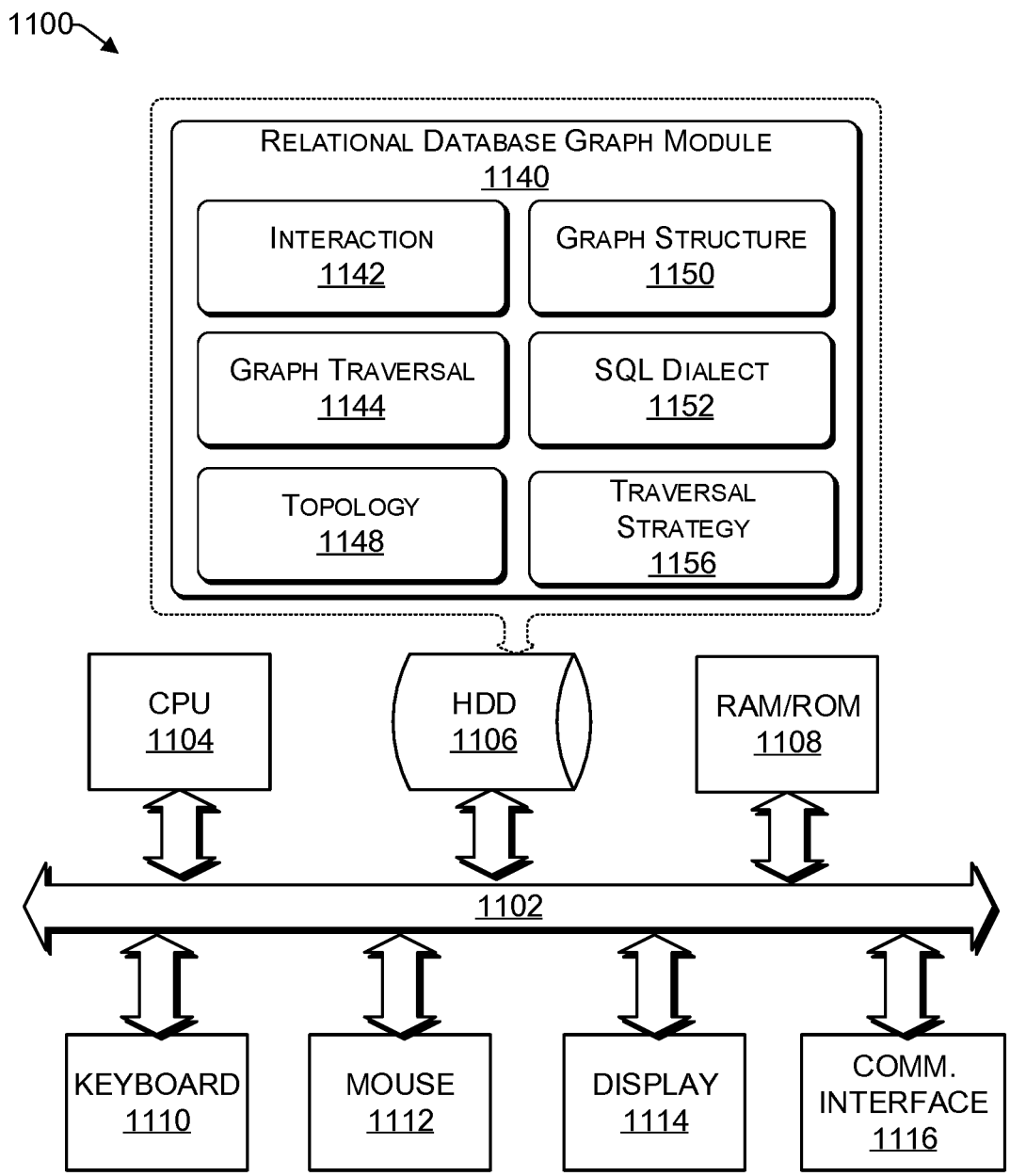
FIG. 11 presents an illustrative computing device that can be used to implement a relational database graph layer, consistent with an illustrative embodiment.

As discussed above, functions relating to performing a synergistic graph query on a relational database, can be performed with the use of one or more computing devices connected for data communication via wireless or wired communication, in accordance with the architectures 100 and 900 of FIGS. 1 and 9, and the process 1000 of FIG. 10. FIG. 11 provides a functional block diagram illustration of a computer hardware platform 1100 that can be used to implement a particularly configured computing device that can host a UX design evaluation engine 1140. In particular, FIG. 11 illustrates a network or host computer platform 1100, as may be used to implement an appropriately configured server, such as the design evaluation server 116 of FIG. 1.

The computer platform 1100 may include a central processing unit (CPU) 1104, a hard disk drive (HDD) 1106, random access memory (RAM) and/or read only memory (ROM) 1108, a keyboard 1110, a mouse 1112, a display 1114, and a communication interface 1116, which are connected to a system bus 1102.

In one embodiment, the HDD 1106, has capabilities that include storing a program that can execute various processes, such as the relational database graph layer 1140, in a manner described herein. The relational database graph layer 1140 may have various modules configured to perform different functions. For example, there may be an interaction module 1142 that is operative to receive electronic graph queries from various graph applications. Further, there may be an interaction module 1142, graph traversal module 1144, topology module 1148, graph structure module 1150, SQL dialect module 1152, and traversal strategy module 1156. The functions of each of these modules has been discussed in detail previously and is therefore not repeated here for brevity.

In one embodiment, a program, such as Apache™, can be stored for operating the system as a Web server. In one embodiment, the HDD 1106 can store an executing application that includes one or more library software modules, such as those for the Java™ Runtime Environment program for realizing a JVM (Java™ virtual machine).

Example Cloud Platform

As discussed above, functions relating to managing the compliance of one or more client domains, may include a cloud 200 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
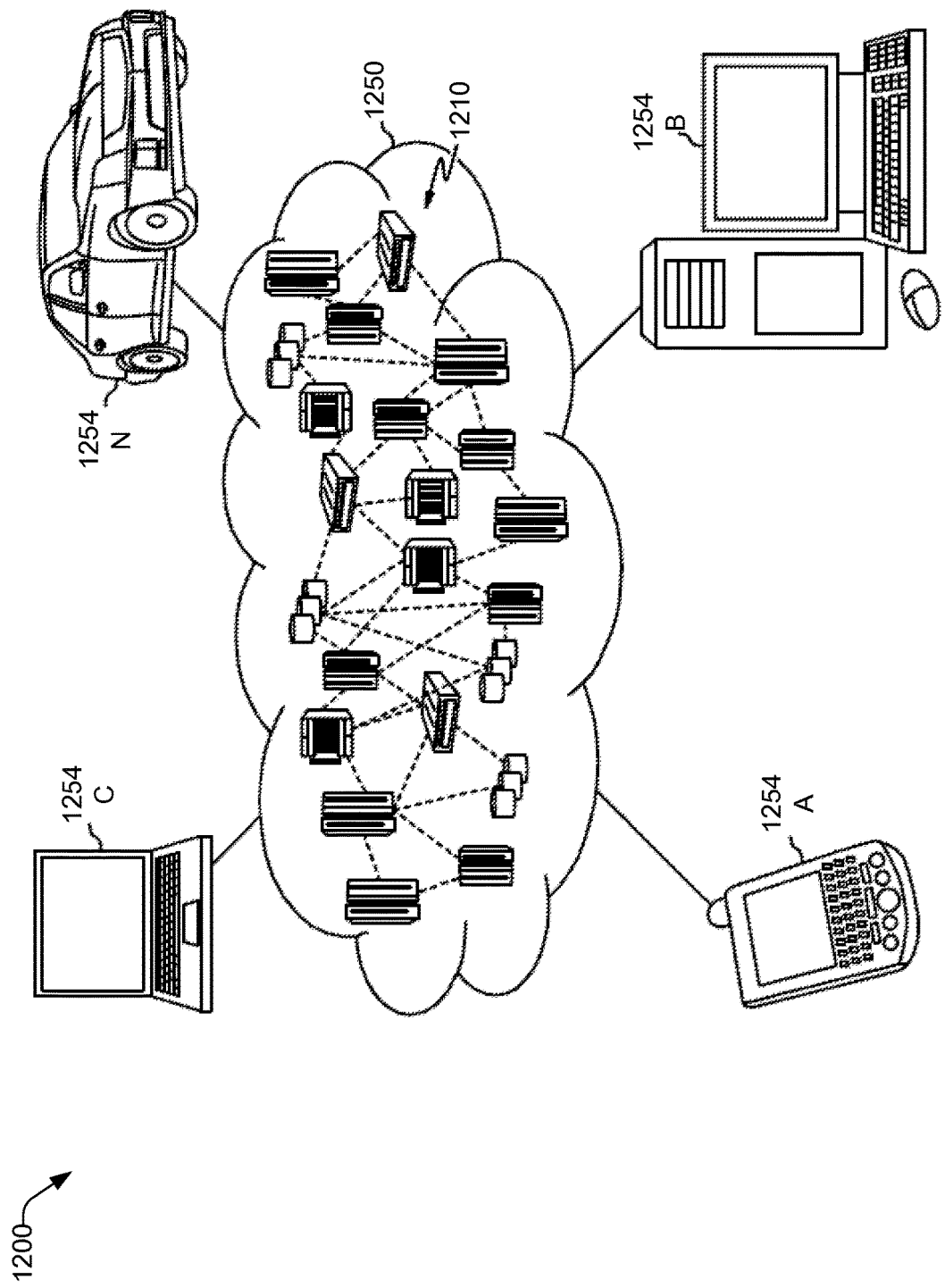
FIG. 12 depicts a cloud computing environment, consistent with an illustrative embodiment.

Referring now to FIG. 12, an illustrative cloud computing environment 1200 is depicted. As shown, cloud computing environment 1200 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
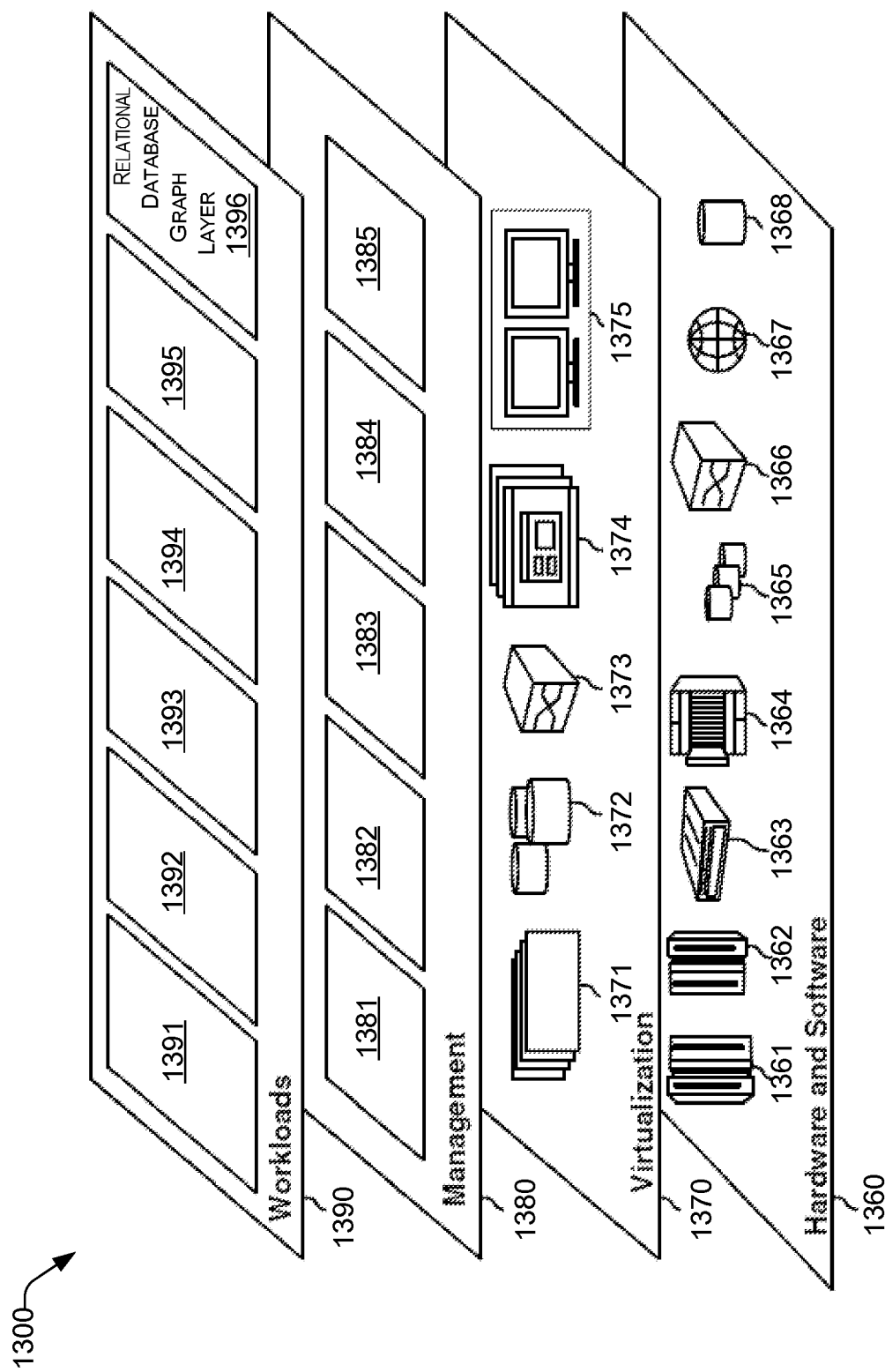
FIG. 13 depicts abstraction model layers, consistent with an illustrative embodiment.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the disclosure are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and relational database graph layer 1396, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a storage device coupled to the processor;
   a query engine;
   a relational database graph module coupled to the query engine and stored in the storage device, wherein an execution of the relational database graph module by the processor configures the computing device to perform acts comprising:
   receiving a graph query;
   translating the graph query into one or more relational database queries;
   sending the one or more relational database queries to be performed on data stored within a relational database;
   receiving one or more results from the relational database based on the sent one or more relational database queries; and
   generating a synergistic graph on a display, based on the received one or more results, wherein the synergistic graph comprises at least one vertex set and one edge set mapping to one or more tables of the relational database, the mapping specifying:
   (i) the one or more tables that store the at least one vertex set and edge set information;
   (ii) what table column(s) are mapped to a required identification (id), a source vertex id (src), and a destination vertex id (dst) field;
   (iii) a label for each vertex and edge; and
   (iv) what columns capture vertex properties and correspond to edge properties, if any.

2. The computing device of claim 1, wherein the query engine is configured to perform queries only on one or more relational databases.

3. The computing device of claim 1, wherein the relational database graph module receives one or more results from the relational database based on the sent one or more relational database queries without importing or exporting relational data to the relational database graph module.

4. The computing device of claim 1, wherein the relational database graph module is configured to reflect in real time changes in data stored in the relational database.

5. The computing device of claim 1, wherein the relational database graph module allows the relational database to be synergistic with different types of analytic workloads of different query applications.

6. The computing device of claim 1, wherein the relational database queries are based on structured query language (SQL).

7. The computing device of claim 1, wherein the synergistic graph comprises different types of vertices and different types of edges that are mapped to a same relational table of the relational database.

8. The computing device of claim 1, wherein:
   at least one vertex set and at least one edge set of the synergistic graph is mapped to more than one relational table; and
   each relational table represents one type of vertex or edge.

9. The computing device of claim 1, wherein execution of the relational database graph module further configures the computing device to perform acts comprising:
   accompanying the sent one or more relational database queries to be performed on data stored within the relational database with instructions to limit the one or more relational database queries to a subset of the relational database.

10. The computing device of claim 1, wherein execution of the relational database graph module further configures the computing device to perform acts comprising: combining a plurality of graph operations into one structured query language (SQL) query.

11. A non-transitory computer readable storage medium tangibly embodying a computer readable program code having computer readable instructions that, when executed, causes a computer device to carry out a method, comprising:
receiving a graph query by a relational database graph module;
translating the graph query into one or more relational database queries;
sending the one or more relational database queries to be performed on data stored within a relational database;
receiving, by the relational database graph module, one or more results from the relational database based on the sent one or more relational database queries; and
generating a synergistic graph on a display, based on the received one or more results, wherein the synergistic graph comprises at least one vertex set and one edge set mapping to one or more tables of the relational database, the mapping specifying:
  (i) the one or more tables that store the at least one vertex set and edge set information;
  (ii) what table column(s) are mapped to a required identification (id), a source vertex id (src), and a destination vertex id (dst) field;
  (iii) a label for each vertex and edge; and
  (iv) what columns capture vertex properties and correspond to edge properties, if any.

12. The non-transitory computer readable storage medium of claim 11, wherein the relational database graph module receives one or more results from the relational database based on the sent one or more relational database queries without importing or exporting relational data to the relational database graph module.

13. The non-transitory computer readable storage medium of claim 11, wherein the relational database graph module is configured to reflect in real time changes in data stored in the relational database.

14. The non-transitory computer readable storage medium of claim 11, wherein the relational database graph module allows the relational database to be synergistic with different types of analytic workloads of different query applications.

15. The non-transitory computer readable storage medium of claim 11, wherein the relational database queries are based on structured query language (SQL).

16. The non-transitory computer readable storage medium of claim 11, wherein the synergistic graph comprises different types of vertices and different types of edges that are mapped to a same relational table of the relational database.

17. The non-transitory computer readable storage medium of claim 11, wherein:
at least one vertex set and at least one edge set of the synergistic graph is mapped to more than one relational table; and
each relational table represents one type of vertex or edge.

18. The non-transitory computer readable storage medium of claim 11, further comprising: accompanying the sent one or more relational database queries to be performed on data stored within the relational database with instructions from the relational database graph module to limit the one or more relational database queries to a subset of the relational database.

* * * * *